(12) United States Patent
Church

(10) Patent No.: US 7,769,564 B2
(45) Date of Patent: Aug. 3, 2010

(54) METHOD AND APPARATUS FOR MONITORING BEARINGS

(75) Inventor: Benjamin Paul Church, Blue Springs, MO (US)

(73) Assignee: Progress Rail Services Corp., Albertville, AL (US)

(*) Notice: Subject to any disclaimer, the term of this patent is extended or adjusted under 35 U.S.C. 154(b) by 664 days.

(21) Appl. No.: 11/691,592

(22) Filed: Mar. 27, 2007

(65) Prior Publication Data

US 2008/0228427 A1 Sep. 18, 2008

Related U.S. Application Data

(60) Provisional application No. 60/886,803, filed on Jan. 26, 2007.

(51) Int. Cl.
G06F 11/30 (2006.01)
G21C 17/00 (2006.01)
B61K 9/04 (2006.01)

(52) U.S. Cl. .................. 702/184; 246/169 A
(58) Field of Classification Search .......... 702/184, 702/183; 246/169 A
See application file for complete search history.

(56) References Cited

U.S. PATENT DOCUMENTS

| | | | |
|---|---|---|---|
| 3,629,572 A | | 12/1971 | Gallagher |
| 3,646,343 A | * | 2/1972 | Caulier et al. ........... 246/169 D |
| 3,697,744 A | | 10/1972 | Howell |
| 4,068,811 A | | 1/1978 | Caulier |
| 4,340,886 A | * | 7/1982 | Boldt et al. .............. 340/682 |
| 4,491,290 A | * | 1/1985 | Douglas ................ 246/169 A |
| 4,659,043 A | | 4/1987 | Gallagher |
| 4,805,854 A | | 2/1989 | Howell |
| 4,928,910 A | | 5/1990 | Utterback et al. |
| 5,060,890 A | | 10/1991 | Utterback et al. |
| 5,149,025 A | | 9/1992 | Utterback et al. |
| 5,446,451 A | * | 8/1995 | Grosskopf, Jr. .......... 340/682 |
| 5,446,452 A | | 8/1995 | Litton |
| 5,659,491 A | | 8/1997 | Ichikawa et al. |
| 5,677,533 A | | 10/1997 | Yaktine et al. |
| 5,734,579 A | | 3/1998 | Sakaguchi |
| 6,241,196 B1 | | 6/2001 | Steurer et al. |

(Continued)

FOREIGN PATENT DOCUMENTS

DE 4238151 A1 5/1994

OTHER PUBLICATIONS

Office Action dated Oct. 6, 2009 for U.S. Appl. No. 11/745,129.

(Continued)

Primary Examiner—Hal D Wachsman
Assistant Examiner—Janet L Suglo
(74) Attorney, Agent, or Firm—Armstrong Teasdale LLP

(57) ABSTRACT

A system to facilitate reducing false train stops includes an infrared sensor that is coupled to a processing unit. The processing unit is programmed to receive inputs from the sensor, generate a bearing profile using the received inputs, classify the bearing profile as at least one of a typical bearing profile and an atypical bearing profile, and if the bearing profile is classified as a typical bearing profile, analyze the typical bearing profile to determine if at least a portion of the typical bearing profile meets the alarm criteria. A method of reducing train stops and generating maintenance alerts are also described herein.

22 Claims, 7 Drawing Sheets

U.S. PATENT DOCUMENTS

| | | |
|---|---|---|
| 6,405,148 B1 | 6/2002 | Hayashi et al. |
| 6,688,561 B2 * | 2/2004 | Mollet et al. ............. 246/473.1 |
| 6,695,472 B1 * | 2/2004 | Nayer ....................... 374/141 |
| 6,813,581 B1 | 11/2004 | Snyder |
| 6,826,489 B2 | 11/2004 | Scanlan et al. |
| 6,872,945 B2 * | 3/2005 | Bartonek ............... 250/339.04 |
| 6,881,951 B2 | 4/2005 | Bartonek |
| 7,024,294 B2 | 4/2006 | Sullivan et al. |
| 7,026,609 B2 | 4/2006 | Bartonek |
| 7,139,668 B2 | 11/2006 | Bechhoefer |
| 7,140,577 B2 | 11/2006 | Mollet et al. |
| 2003/0236598 A1 * | 12/2003 | Antelo et al. ................. 701/19 |
| 2005/0194497 A1 * | 9/2005 | Matzan ................... 246/169 A |
| 2006/0131464 A1 | 6/2006 | Hesser et al. |

OTHER PUBLICATIONS

Office Action dated Jun. 12, 2009 for U.S. Appl. No. 11/745,129.
Office Action dated Dec. 2, 2008 for U.S. Appl. No. 11/745,129.
Office Action dated Jul. 15, 2008 for U.S. Appl. No. 11/745,129.
Office Action dated Jan. 17, 2008 for U.S. Appl. No. 11/745,129.

* cited by examiner

METHOD AND APPARATUS FOR MONITORING BEARINGS

CROSS REFERENCE TO RELATED APPLICATIONS

This application is entitled to the benefit of, and claims priority to, provisional U.S. Patent Application Ser. No. 60/886,803 filed on Jan. 26, 2007, and entitled "Method and Apparatus for Monitoring Bearings", which is hereby incorporated by reference in its entirety.

BACKGROUND OF THE INVENTION

This invention relates generally to automated railroad operation, and more particularly, to a method and apparatus for analyzing train bearing data to reduce false stops.

Modern railroad car wheel bearings are permanently lubricated sealed units designed to last for the life of the car. However, during operation, excess friction between the axle and the bearing may produce excess heat, resulting in a condition referred to as a hot box. Moreover, when a bearing begins to operate above a predetermined temperature, continued movement of the car may cause the bearing to seize. As a result, the railroad service industry has devoted significant resources to building detectors that automatically check passing trains for hot boxes and/or hot wheels. Such detectors are generally spaced along railroad tracks at about twenty to fifty mile intervals along main-line track, and many are necessarily located in remote places.

At least one known detector includes a sensing unit lens for focusing infrared radiation that is transmitted from passing railcar bearings onto an infrared sensor. The infrared sensor is coupled to electrical circuitry which develops a signal that is representative of the journal or wheel temperature. One sensing unit is placed along one rail of the tracks and a second sensing unit is placed along the other rail of a set of tracks, so that both sides of a train can be monitored. Electrical lines connect these trackside sensing units to processing circuitry which is generally located in a "bungalow" close to the tracks. The primary use of the detector is to detect overheated bearings and alert the train operator to prevent possible damage to the railcar bearings.

In operation, if the hot box detector detects a hot box condition, a signal that indicates that the temperature of a wheel journal exceeds a predetermined value is then transmitted. Specifically, when a hot box condition is detected, i.e. the signal triggers an alarm, the train car is stopped to manually inspect the suspect wheel bearing or hot box. However, under some operating conditions, microphonic noise, sunshots, and/or sensor misalignment, for example, may cause the sensing unit to transmit a signal indicative of a hot box condition when in fact a hot box condition has not occurred. In this case, as in the previous case, the train car is stopped to manually inspect the suspect wheel bearing or hot box. However since the bearing is determined to be operating under normal conditions, this event is classified as a Hot Box System Nothing Found (NF) Stop. After a NF stop is reported, railroad personnel manually evaluate the data captured in the hot box to identify the reason for the NF stop.

While this post event analysis is useful in identifying equipment maintenance or repair concerns, the NF stop still increases the man-hours and costs of delivering products in a timely manner to their final destination. As a result, an actual or anomalous signal that is transmitted by the sensing unit indicating that a hot box condition has occurred causes the train operator to stop the train and perform a bearing inspection.

BRIEF DESCRIPTION OF THE INVENTION

In one embodiment, a method for reducing false train stops is provided. The method includes receiving inputs from a sensor, generating a bearing profile using the received inputs, classifying the bearing profile as at least one of a typical bearing profile and an atypical bearing profile, and if the bearing profile is classified as a typical bearing profile, analyzing the typical bearing profile to determine if at least a portion of the typical bearing profile exceeds a predetermined threshold.

In another embodiment, a hotbox detection system is provided. The hotbox detection system includes a first infrared bearing scanner, a second infrared bearing scanner, and a processing unit coupled to the first and second infrared bearing scanners. The processing unit is programmed to receive inputs from the first and second infrared bearing scanners, generate a bearing profile using the received inputs, classify the bearing profile as at least one of a typical bearing profile and an atypical bearing profile, and if the bearing profile is classified as a typical bearing profile, analyze the typical bearing profile to determine if at least a portion of the typical bearing profile exceeds a predetermined threshold.

DETAILED DESCRIPTION OF THE INVENTION

Many specific details of certain embodiments of the invention are set forth in the following description in order to provide a thorough understanding of such embodiments. One skilled in the art, however, will understand that the present invention may have additional embodiments, or that the present invention may be practiced without several of the details described in the following description.

Figure 1:
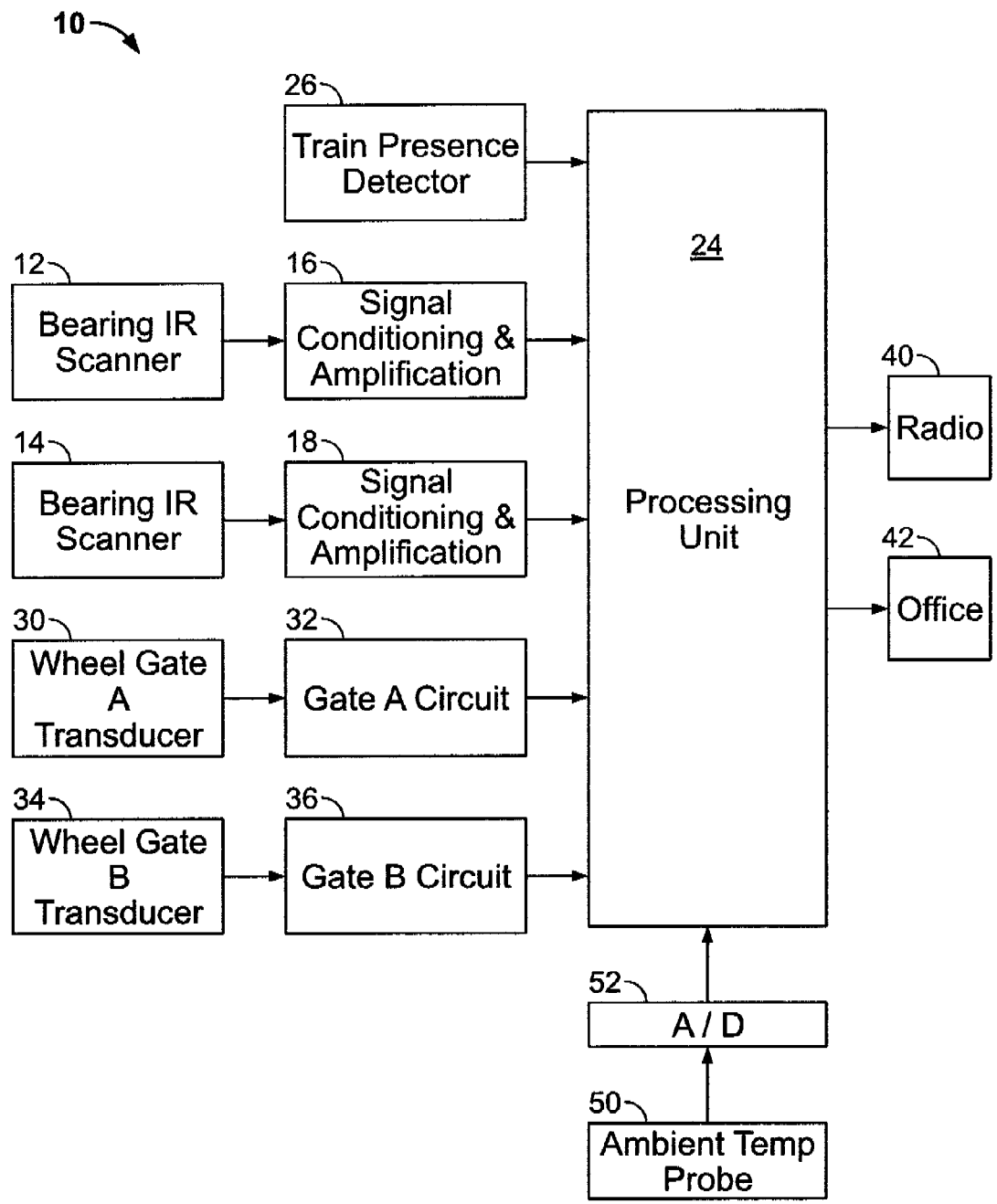
FIG. 1 is a schematic illustration of an exemplary hot box detection system.

FIG. 1 is a schematic illustration of an exemplary apparatus, or hot box detection system 10 for detecting overheated railroad journal bearings. System 10 includes a first infrared bearing scanner 12 and a second infrared bearing scanner 14. In the exemplary embodiment, infrared scanners 12 and 14 each include a lens (not shown) for focusing impinging infrared onto a pyroelectric cell (not shown) or other suitable infrared sensing unit or sensor. In the exemplary embodiment, the lens is a germanium lens that focuses and transmits only the far infrared portion of the spectrum. During operation, the pyroelectric cell, which may be fabricated from LiTaO$_3$, converts the impinging infrared radiation to an analog electrical voltage having a magnitude that is directly proportional to the infrared radiation of passing objects.

System 10 also includes a first signal conditioning and amplification unit 16 that is coupled to and receives a signal from first bearing IR scanner 12. System 10 also includes second signal conditioning and amplification unit 18 that is coupled to and receives a signal from second bearing IR scanner 14. Each of signal condition units 16 and 18 are configured to condition and amplify the voltage component of the signal transmitted from each respective IR scanner 12, thereby measuring the voltage response of the IR Scanner to changes in the amount of infrared energy. In the exemplary embodiment, the output signal of the scanner 12 exhibits a linear response to passing objects traveling at speeds in the range of approximately 5 miles per hour to approximately 150 miles per hour.

The analog signal generated by each respective signal condition unit 16 and 18 are transmitted to a processing unit 24 which in the exemplary embodiment is a microcontroller. Processing unit 24 includes an analog to digital converter (A/D converter) (not shown), which converts the analog signal to a digital signal. All further signal processing and all instructions are performed digitally.

In the exemplary embodiment, processing unit 24 includes all of the circuits required for fetching, interpreting, and executing instructions that are stored in memory, whether volatile or nonvolatile. Processing unit 24 further includes a program counter, an instruction decoder, an arithmetic logic unit, and accumulators. Computer programs, or software, are stored in memory storage units. A suitable memory storage unit used in the preferred embodiment is an electrically erasable programmable read only memory (hereinafter "EEPROM"). Moreover, it is understood that other types of memory units could be utilized, such as simple read only memory (ROM), or programmable read only memory (PROM), or, if the ability to reprogram the ROM is desirable, erasable programmable read only memory (EPROM), which are conventionally erased by exposure to ultraviolet light or FLASH memory.

System 10 also includes a train presence detector 26 which is configured to determine the presence of a train approaching system 10. In the exemplary embodiment, the processing unit 24 will energize or de-energize a shutter (not shown) that is utilized to cover and protect the IR sensor (not shown) contained in the bearing scanners 12 and 14 based upon the state of the train presence detector 26.

System 10 further includes a first wheel gate transducer 30 that is coupled on a railroad track (not shown) and connected to processing unit 24 via a first gate circuit 32. System 10 also includes a second wheel gate transducer 34 that is connected to processing unit 24 via a second gate circuit 36. Such transducers, referred to hereinafter as the gate on and gate off transducers respectively, typically are spaced apart longitudinally along the rails a distance of about 24 inches. The processing unit 24 determines the IR samples associated with a passing bearing using the gate on and gate off pulses generated by these transducers.

The length of time that the wheel component to be scanned is in the scanning zone will be referred to as the scanning period. The scanning period of the system 10 is sized to accommodate a range of rolling stock wheel sizes varying up to approximately 42 inches and for different train speeds. Accordingly, the wheel gate transducers 30 and 34 each transmit a signal to processing unit 24 when a train wheel passes over it. More specifically, each wheel gate transducer 30, 34 generates an analog signal that is transmitted to a respective gate circuit 32, 36 which converts the analog signal to a digital signal which is then transmitted to processing unit 24 to generate an interrupt signal.

In the exemplary embodiment, system 10 is configured to transmit a warning indication that is generated by processing unit 24. For example, the radio unit may be configured to transmit a signal to a radio unit 40 that is mounted in a passing train to alert the train operator that a hot box alarm has been generated. Moreover, system 10 may transmit information to a remote office 42 including train summary data, detailed train data, bearing profiles, warnings and alarm information.

Figure 2:
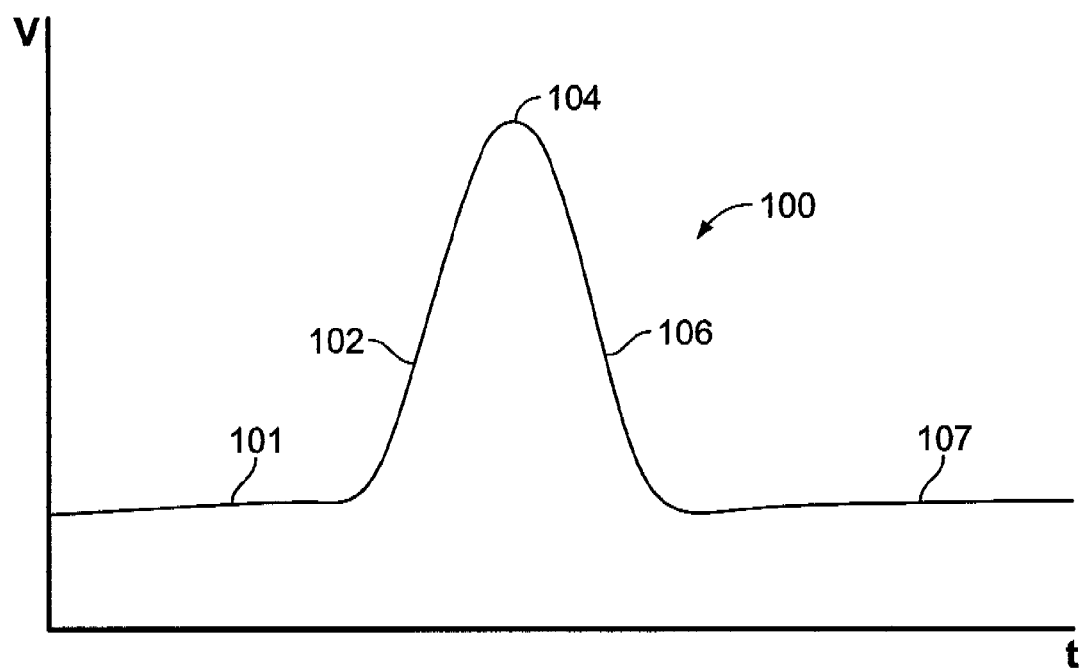
FIG. 2 is a graphical illustration of a typical bearing profile.

FIG. 2 is a graphical illustration of a typical bearing profile collected by the processing unit 24 from scanner 12 during the sampling period. The operation of bearing scanner 12 is substantially the same as the operation of bearing scanner 14, as such, the below description will be described with respect to bearing scanner 12, although it should be realized that the description also applies to bearing scanner 14. As used herein, a "typical" response is defined as a signal, after being filtered by processing unit 24 includes a single peak or plateau. Referring to FIG. 2, a typical signal 100 includes a region 101 before the bearing is in view of the IR sensor when the sensor is measuring the ambient railcar undercarriage temperature, a rising edge 102 when the bearing comes into partial view of the scanner 12, a single peak or plateau 104 based upon a scanner full view of the bearing, a falling edge 106 when the scanner has only a partial view of the bearing as the bearing begins to pass out of the view, and a return to the ambient railcar undercarriage temperature 107 when the bearing is out of view of the scanner.

The ambient temperature data generated by the ambient temperature probe 50 is utilized in reports, logging, and to announce ambient temperature to the train crew, for example.

However, as discussed above, conditions such as microphonic noise, sunshots, and/or scanner misalignment, for example, may cause the bearing scanner to transmit a signal indicative of a hot box condition when in fact a hot box condition has not occurred. In some cases, these conditions may cause the signal transmitted by bearing scanner 12 to include multiple peaks as shown in FIGS. 3-8. A signal that is different than the typical signal as shown in FIG. 2, is defined herein as an atypical or unacceptable signal.

Figure 9:
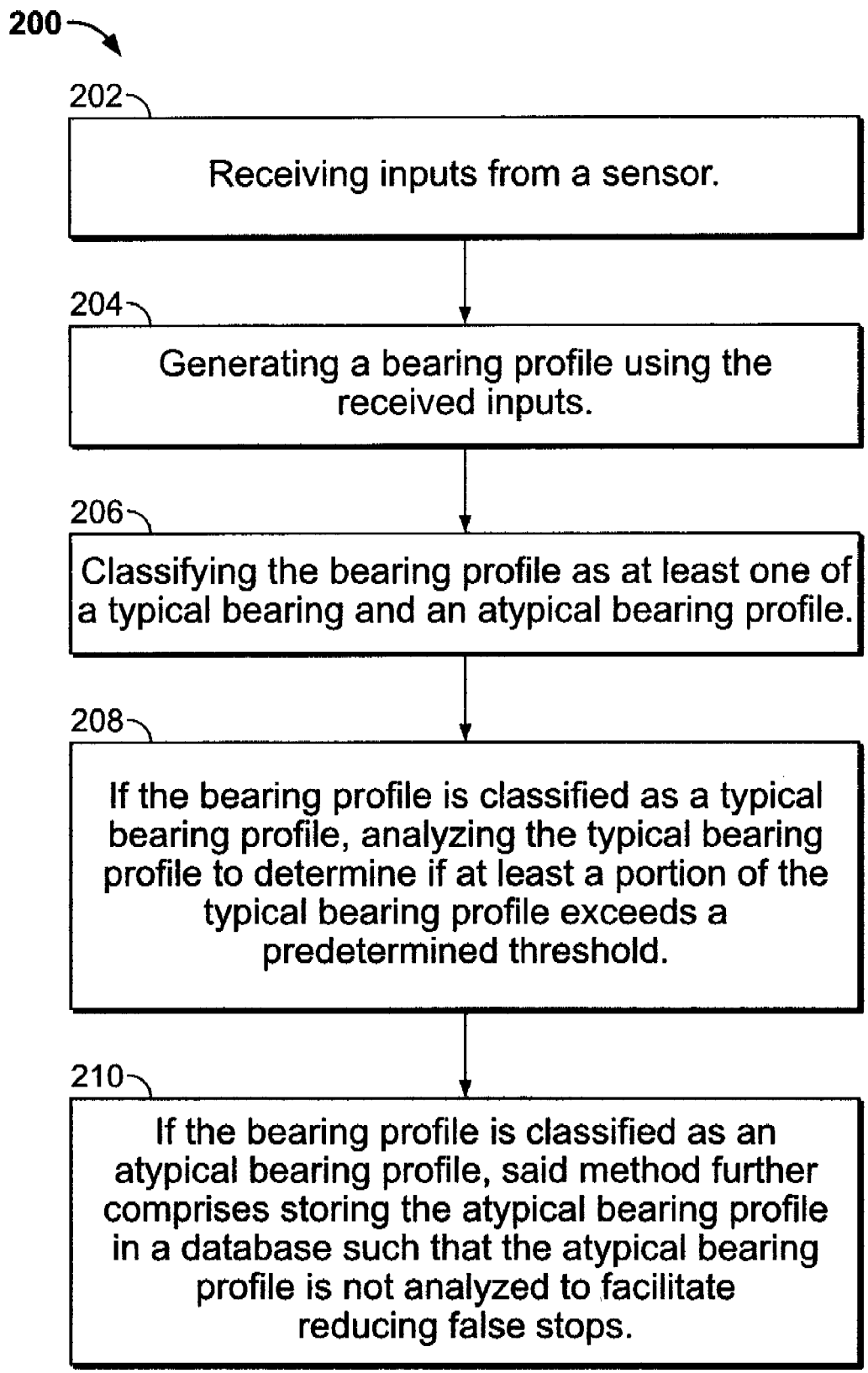
FIG. 9 is a flow chart illustrating an exemplary method of reducing false stops.

To reduce and/or eliminate atypical signals transmitted from a bearing scanner 12 from being processed by processing unit 24 as alarms, and thus to facilitate reducing false stops, an exemplary algorithm or filter is programmed into processing unit 24. Specifically, FIG. 9 illustrates an exemplary algorithm 200 that is programmed into processing unit 24 to facilitate reducing false stops. As shown in FIG. 9, algorithm 200 is programmed to receive 202 inputs from bearing scanner 12, generate 204 a bearing profile using the received inputs, classify 206 the bearing profile as at least one of a typical bearing profile and an atypical bearing profile, and if the bearing profile is classified as a typical bearing profile, analyzing 208 the typical bearing profile to determine if at least a portion of the typical bearing profile meets a predetermined alarm criteria. Optionally, if the bearing profile is classified as an atypical bearing profile, the atypical bearing profile is stored 210 in a database but will be not be analyzed by the hot bearing alarm algorithm. Since the atypical bearing profile is not analyzed, any peaks within the data that exceed a predetermined threshold, i.e. any hot box alarms in the atypical profile, will not be used to generate an alarm condition, thus reducing false stops.

As used herein, a bearing profile is defined as a collection of sensor readings and their relationship to each other that are collected from a bearing scanner 12 during the scanning period. More specifically, during operation, system 10 collects data from scanner 12 and stores this collected data in a buffer that is within processing unit 24, for example. Moreover, during operation, a train wheel passes over a first wheel gate transducer 30, i.e. trips the first wheel gate transducer 30, then continues downstream and activates the second wheel gate transducer 34. Since, the distance between the first wheel gate transducer 30 and the second wheel gate transducer 34 is known, that is, this information has been previously stored in processing unit 24, processing unit 24 then utilizes this distance information to determine the speed and direction of the train wheel passing through the first and second wheel gate transducers and the location of the scanner data within the buffer. Once, the speed and direction of the train wheel has been determined, processing unit 24 retrieves the bearing scanner 12 data stored in the buffer to generate a bearing profile.

For example, at least one known system receives inputs from the bearing scanner 12, and if any of the inputs exceeds a predetermined threshold, an alarm condition is activated. However, as discussed herein, the known systems do not analyze the bearing profiles to determine whether the bearing profile has one or many peaks. Profiles containing multiple peaks 104 would be indicative of an atypical bearing profile that may cause a false stop condition to occur. In the exemplary embodiment, the bearing profile includes twenty-eight data points. However, it should be realized that the quantity of data points is determined based on the processing capabilities of processing unit 24, and as such, it should be realized that any number of data points, including more or less than twenty-eight points may be utilized to generate the bearing profile.

Referring again to FIGS. 3-8, during operation algorithm 200 first receives 202 inputs from bearing scanner 12 and then generates 204 a bearing profile using the received inputs. FIGS. 3-8 each represent an exemplary bearing profile generated using algorithm 200. The bearing profile is then classified 206 to determine whether the bearing profile is typical or atypical.

For example, algorithm 200 is programmed to detect and filter alarms, i.e. classify the bearing profile as atypical, when the bearing profile includes more than one significant waveform. A significant waveform within a portion of the profile is defined by an increase in temperature above a rising edge detect threshold 230 that is configurable by the operator, to a peak or plateau followed by a decrease in temperature below a falling edge detect threshold 232 that is configurable by the operator.

Figure 3:
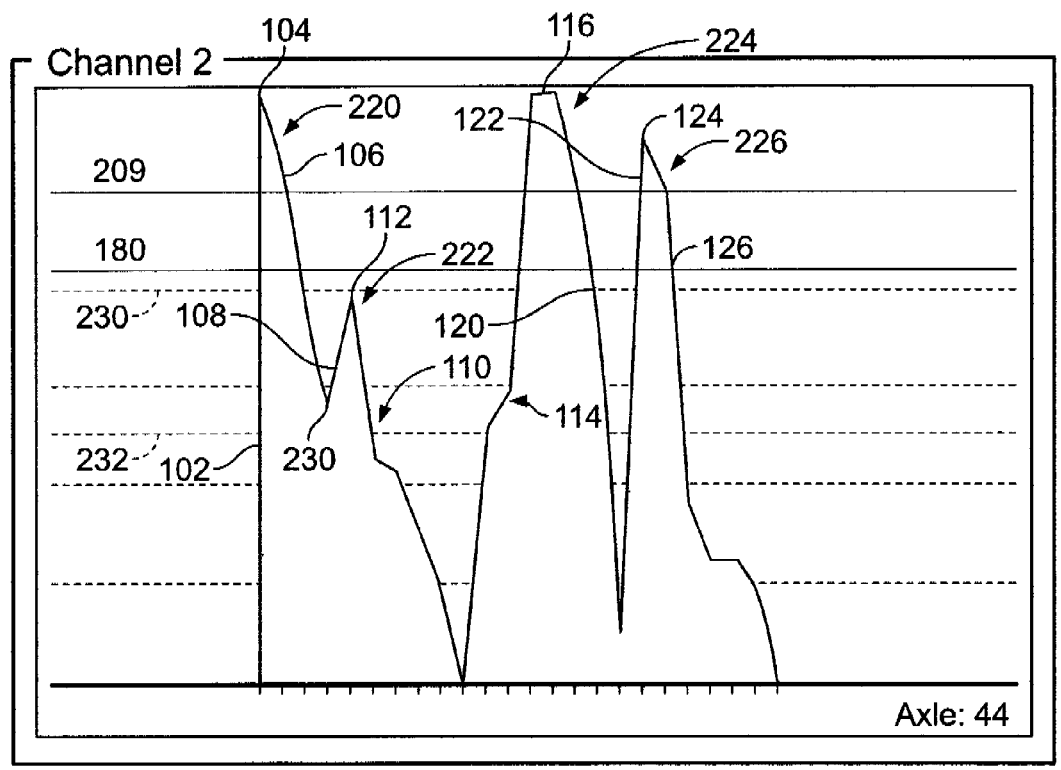
FIG. 3 is a graphical illustration of an atypical bearing profile.
Figure 4:
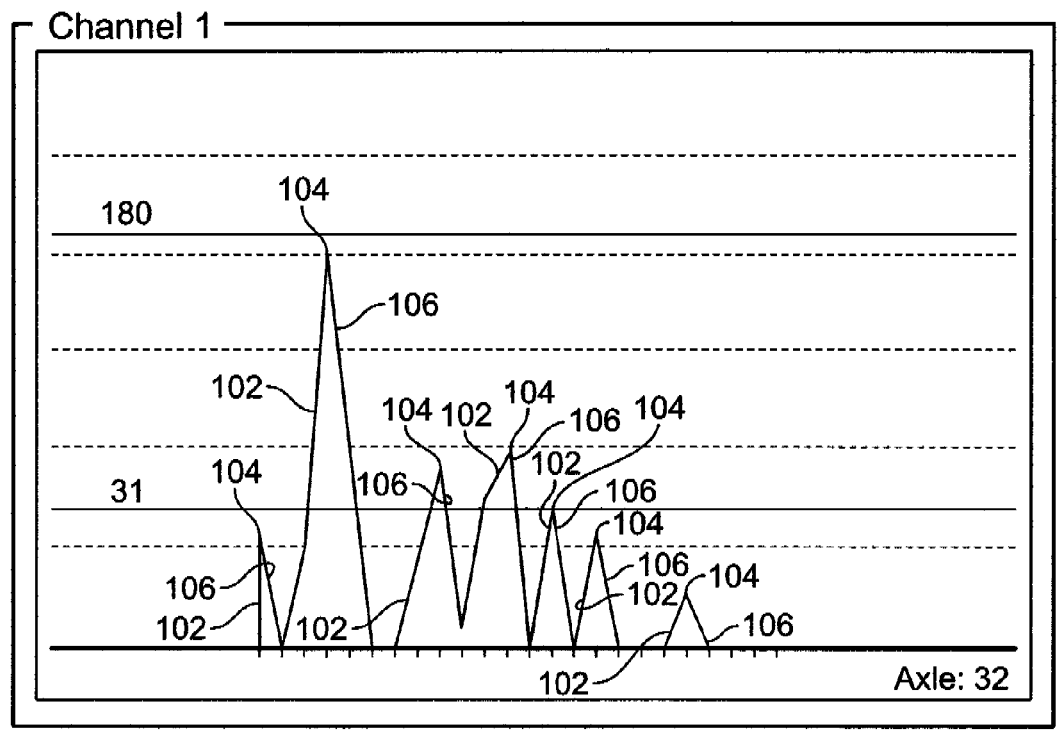
FIG. 4 is a graphical illustration of another atypical bearing profile.
Figure 5:
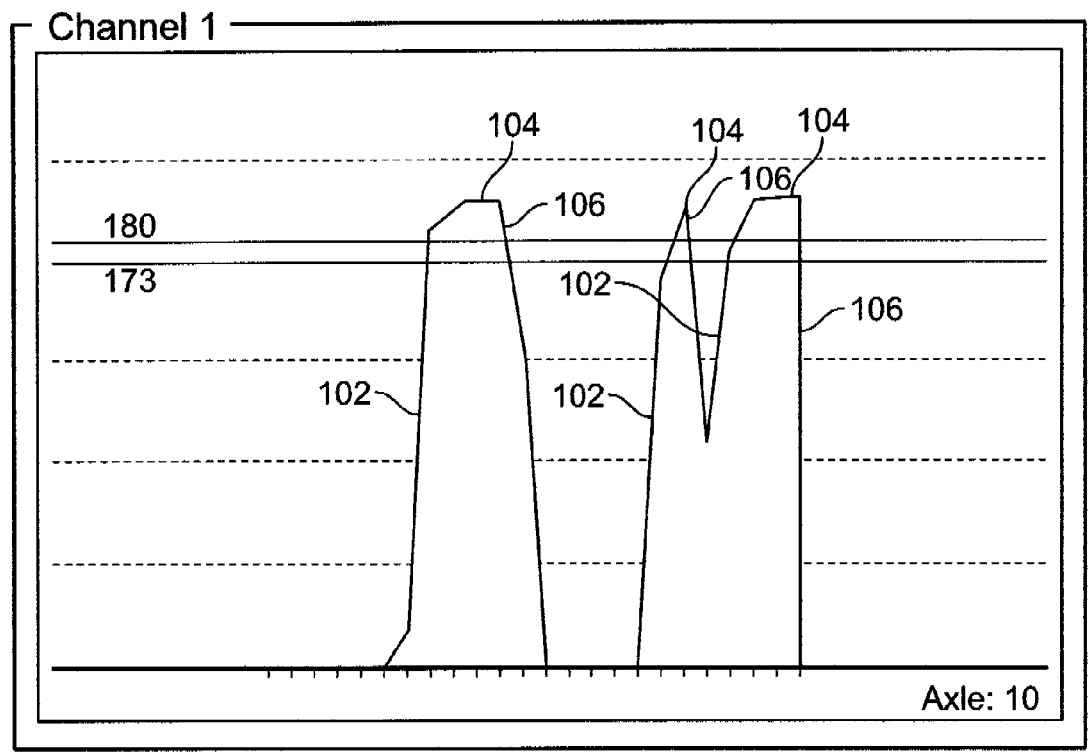
FIG. 5 is a graphical illustration of another atypical bearing profile.
Figure 6:
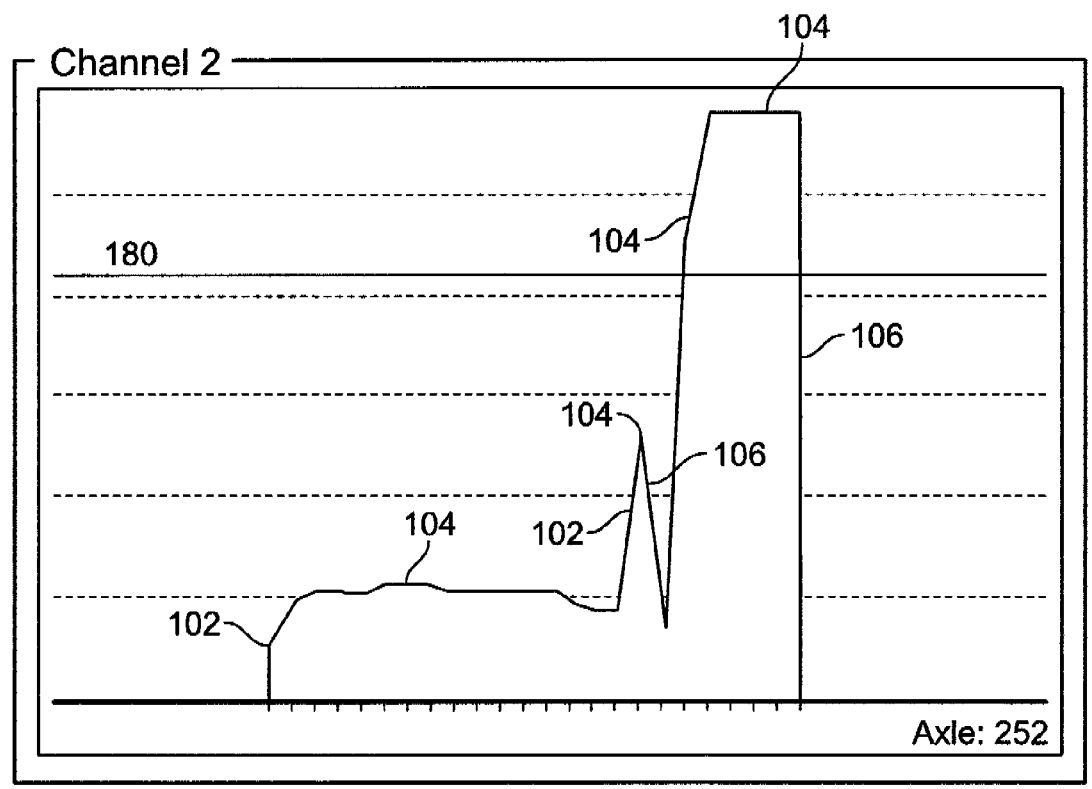
FIG. 6 is a graphical illustration of another atypical bearing profile.
Figure 7:
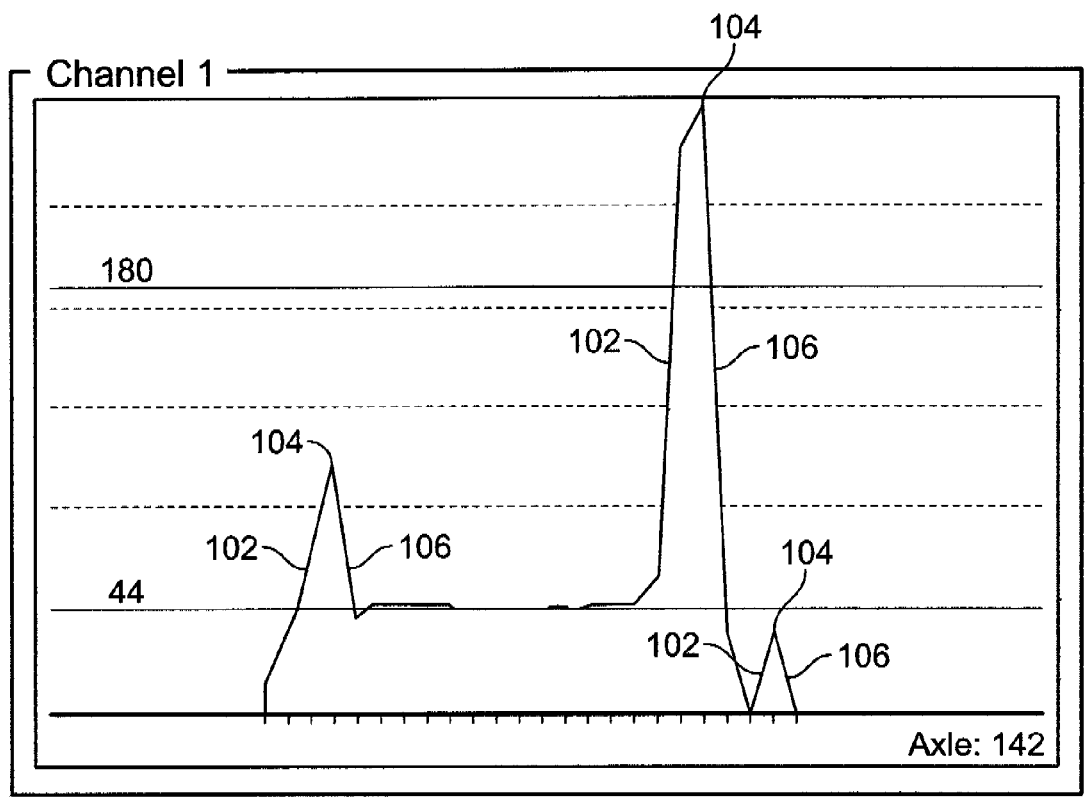
FIG. 7 is a graphical illustration of another atypical bearing profile.
Figure 8:
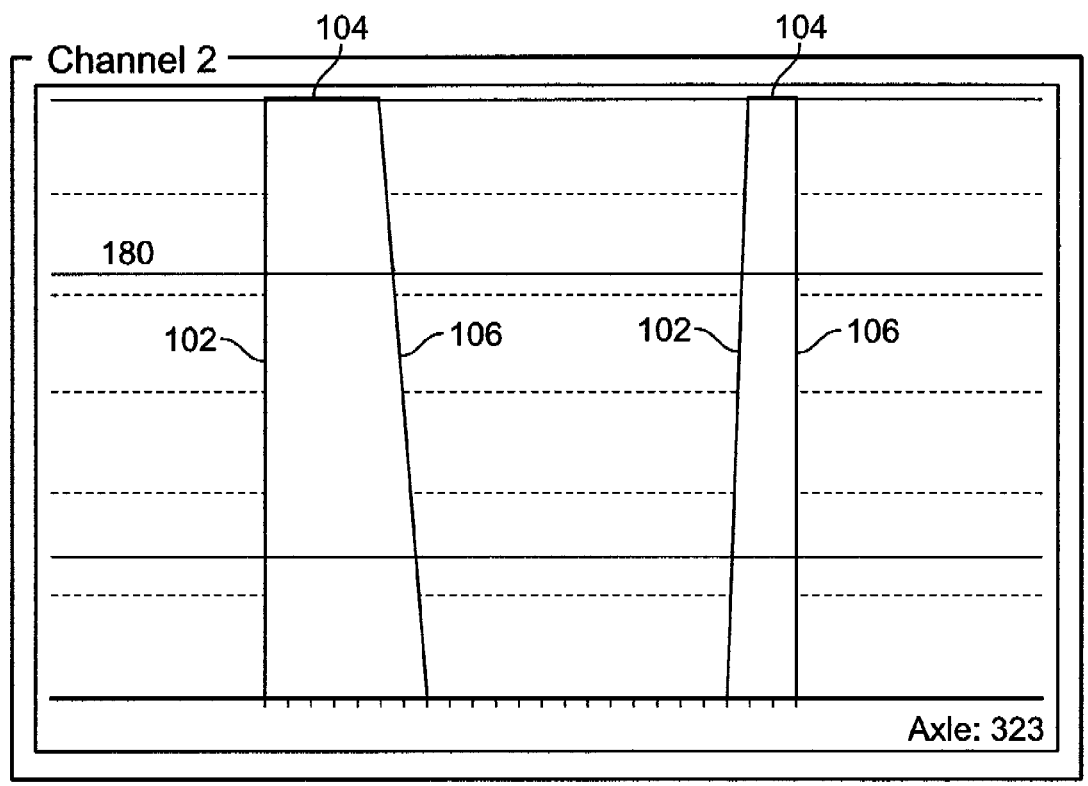
FIG. 8 is a graphical illustration of another atypical bearing profile.

For example, FIG. 3 includes three significant waveforms and would be classified as atypical per this definition. The first significant waveform 220 is formed by the rising edge 102 crossing the rising edge detect threshold 230, a peak 104, a falling edge 106 ending at valley 230 which is above the falling edge detect 232, followed be a minor rising edge 108 and peak 112, followed by a falling edge 110 dropping below the falling edge threshold 232. The second significant waveform 224 is formed by a rising edge 114, a peak 116, and a falling edge 120. The third significant waveform 226 is formed by a rising edge 122, a peak 124, and a falling edge 126.

In the exemplary embodiment, profiles containing multiple significant waveforms can be classified as atypical. In another embodiment, profiles can be classified as atypical when the number of significant waveforms exceed a count threshold configurable by the operator.

In the exemplary embodiment, the level utilized by algorithm 200 to evaluate the rising and falling edge thresholds may be configurable by the operator or may be factory preset. For example, these thresholds may be selected as a temperature level between approximately 0 degrees Fahrenheit and approximately 255 degrees Fahrenheit above ambient.

In another embodiment, a delta threshold between the peak temperature and the valley temperatures contained in a bearing profile may be utilized to detect significant waveforms by algorithm 200 to categorize bearing profiles as either typical or atypical.

Figure 10:
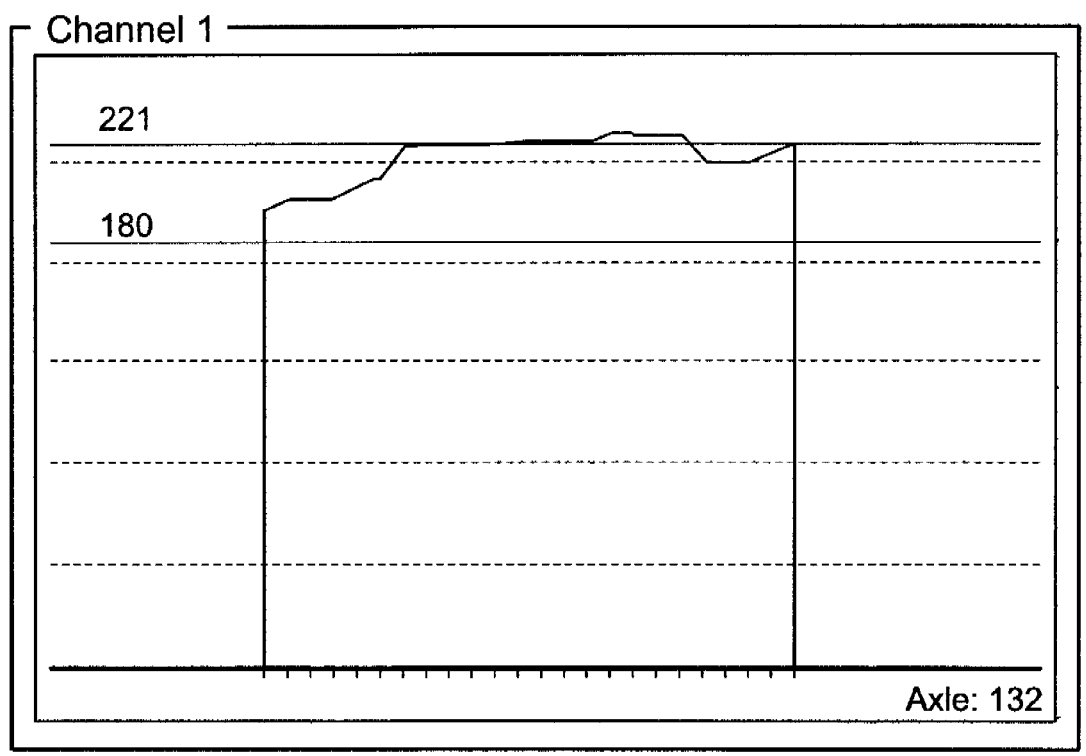
FIG. 10 is another graphical illustration of another atypical bearing profile.

In another embodiment, algorithm 200 is further programmed to detect and filter alarms, i.e. classify the bearing profile as atypical, when the bearing profile has constant energy over a configurable threshold level for a large percentage of the profile. For example, FIG. 10 illustrates a bearing profile wherein the temperature level of the profile is not continuously rising or falling as would be expected in a typical bearing profile. In the exemplary embodiment, if the bearing profile exceeds a predetermined temperature level for all samples in the bearing profile window or for a significant number of samples preset or configured by an operator, the bearing profile will be classified as atypical.

In another exemplary embodiment, algorithm 200 may be written to determine the bearing profile by analyzing the peaks contained within each bearing profile. For example, a bearing profile that includes a single peak may be classified as a typical bearing profile, whereas a bearing profile that include multiple peaks may be classified as an atypical bearing profile.

In another embodiment, the system collects and logs the results of the bearing profile analysis for each train. This log may include a time and a date of train passage, and/or a summary of statistics for each train indicating the number of typical and atypical bearings that may be further categorized by atypical bearing profile type.

In another embodiment, the system will generate maintenance alerts when the number of atypical profiles on a train exceed a configurable count threshold. The maintenance alerts may be configurable to broadcast system integrity warning or failure messages over the radio or via a message, report the alert to a central office, report the alert to a cell phone or pager, and/or report an alert to other wireless devices.

In another exemplary embodiment, a method for reducing false train stops includes receiving inputs from at least one sensor, generating a bearing profile utilizing the received inputs, analyzing the bearing profile to determine if any portion of the bearing profile exceeds a predetermined alarm criteria, and classifying the bearing profile as at least one of a typical bearing profile and an atypical bearing profile if any portion of the bearing profile exceeds the predetermined alarm criteria. A Hot Box Alarm is the generated only if the bearing profile is classified as a typical bearing profile.

The bearing profiles, both typical and atypical may be stored within a database, for example within microprocessor 24, or alternatively, the may be maintained at a remote site that is accessible to the operator and/or the system provider.

Train summary information may be stored within a database, for example within microprocessor 24, or alternatively, the may be maintained at a remote site that is accessible to the operator and/or the system provider. In the exemplary embodiment, the system log includes train summary data.

For example, Table I illustrates an exemplary train summary report that was generated using system 10 shown in FIG. 1. In this table, each row provides summary data collected by system 10 from an exemplary train. Next to the Index number in the first column there are profile status flags indicating profile data was collected based upon the existing configurable site parameters.

TABLE I

| Indx # | Dir | Axle # | Car Cnt | Spd In/Out | Alrm Cnt | Int Cnt | Tmp | Avg Ch1 | Avg Ch2 | Arrival Time | Date | Flags |
|---|---|---|---|---|---|---|---|---|---|---|---|---|
| 99 | W | 428 | 102 | 32/6 | 0 | 0 | 48 | 27 | 26 | 23:02 | Oct. 16, 2006 | NN |
| 98 | W | 332 | 37 | 37/39 | 0 | 0 | 48 | 37 | 38 | 22:50 | Oct. 16, 2006 | NN |
| 97 | W | 326 | 42 | 28/28 | 0 | 0 | 52 | 44 | 40 | 20:59 | Oct. 16, 2006 | NN |
| 96 | W | 342 | 54 | 37/38 | 0 | 0 | 54 | 45 | 41 | 20:38 | Oct. 16, 2006 | NN |
| 95 | W | 448 | 109 | 22/19 | 0 | 0 | 54 | 42 | 44 | 20:14 | Oct. 16, 2006 | NN |
| 94 T | E | 100 | 25 | 37/36 | 0 | W | 54 | 0 | 1 | 19:34 | Oct. 16, 2006 | NN |
| 93 T | W | 100 | 25 | 32/32 | 1 | 0 | 55 | 0 | 1 | 19:04 | Oct. 16, 2006 | NN |
| 92* | W | 64 | 16 | 87/87 | 0 | 0 | 55 | 48 | 42 | 18:59 | Oct. 16, 2006 | NN |
| 91* | W | 230 | 27 | 69/67 | 0 | 0 | 57 | 47 | 47 | 18:39 | Oct. 16, 2006 | NN |
| 90* | W | 368 | 53 | 69/66 | 0 | 0 | 57 | 53 | 56 | 18:26 | Oct. 16, 2006 | NN |
| 89^ | W | 330 | 81 | 30/24 | 1 | 0 | 57 | 22 | 25 | 17:52 | Oct. 16, 2006 | NN |
| 88* | W | 264 | 27 | 28/26 | 0 | 0 | 57 | 19 | 24 | 17:26 | Oct. 16, 2006 | NN |
| 87^ | W | 242 | 25 | 50/43 | 1 | 0 | 59 | 29 | 40 | 16:38 | Oct. 16, 2006 | NN |
| 86* | W | 346 | 41 | 53/47 | 0 | 0 | 59 | 40 | 51 | 16:23 | Oct. 16, 2006 | NN |
| 85* | W | 312 | 46 | 42/48 | 0 | 0 | 59 | 35 | 38 | 15:46 | Oct. 16, 2006 | NN |
| 84* | W | 344 | 38 | 58/53 | 0 | 0 | 57 | 29 | 41 | 13:53 | Oct. 16, 2006 | NN |
| 83* | W | 492 | 120 | 35/32 | 0 | W | 52 | 48 | 46 | 12:26 | Oct. 16, 2006 | P NN |
| 82$ | W | 382 | 52 | 19/17 | 0 | W | 50 | 28 | 35 | 11:55 | Oct. 16, 2006 | P NN |
| 81$ | W | 242 | 29 | 29/24 | 0 | W | 50 | 28 | 35 | 11:39 | Oct. 16, 2006 | P NN |
| 80* | W | 298 | 35 | 35/43 | 0 | W | 48 | 23 | 29 | 11:25 | Oct. 16, 2006 | P NN |
| 79^ | W | 276 | 65 | 42/48 | 1 | W | 46 | 34 | 44 | 10:40 | Oct. 16, 2006 | P NN |
| 78 | W | 268 | 33 | 33/15 | 0 | W | 45 | 37 | 40 | 09:58 | Oct. 16, 2006 | P NN |
| 77* | W | 236 | 38 | 40/37 | 0 | W | 43 | 44 | 46 | 09:46 | Oct. 16, 2006 | P NN |

Profile Key:
* = Warm,
^ = Alarm,
$ = Corrected
Flag Key:
B = Bad Data,
D = Del Axles,
P = Pwr Fail,
V = Low Volt
X = Trn Sent,
N = Trn Not Sent,
W = Trn Waiting To Send As shown in Table I, system 10 has alarmed on three trains (see "^" next to index numbers 79, 87, and 89). Moreover, system 10 has flagged warm bearing profiles on ten trains (see "*" next to index numbers 77, 80, 83, 84, 85, 86, 88, 90, 91, and 92), and flagged corrected bearing profiles on two trains (see "$" next to index numbers 82, 83). Moreover, eight trains, had channel 2 average temperatures more than five degrees higher than channel 1 (See ch2 temperature compared to ch1 temperature on index numbers 79, 80, 81, 82, 84, 86, 87, 88).

As discussed above, when an alarm is generated train crews are required to stop the train and inspect the particular axle for defects. Common types of alarms for train inspection systems are hot bearing, hot wheel, cold wheel, high/wide/shifted loads, and dragging equipment. In this example, Table I illustrates that three hot bearing alarms (see "^" next to index numbers 79, 87, and 89) generated were found to be false alarms by the train crew and as a result caused three false stops.

To further reduce false stops, system 10 is programmed to provide automatic Train Inspection System maintenance alerts to railroad personnel based upon algorithms that analyze primary sensor summary statistics to detect abnormal "highside" sensor readings. "Highside" readings are defined as sensor readings above a nominal threshold. Examples of "highside" readings in Hot Box detectors are bearing temperature readings above a warm bearing threshold temperature.

More specifically, as discussed above, detection system 10 is configured to monitor and analyze bearing temperature for a single train that includes a plurality of cars each having at least two axles. Moreover, system 10 is configured to store this data for a plurality of trains within the database. As a result, system 10 is configured to automatically analyze the bearing data from a plurality of trains to determine if a hot box detection system 10 has failed or requires maintenance.

For example, Table I illustrates that a single system 10 has generated three hot bearing alarms (see "^" next to index numbers 79, 87, and 89) that resulted in three false stops. In this embodiment, system 10 is programmed to automatically analyze the data from a single train or a plurality of trains to determine whether a statically high number of hot bearing alarms resulting in false stops has occurred.

Warm bearing thresholds are configurable and are typically set at a level below the hot bearing threshold and are used as an early indicator of potential degradation of the bearing. Profiles flagged as warm may indicate a bearing elevated above a normal level but has not yet exceeded the hot bearing threshold.

Statistically, in normal operating conditions, it would be abnormal to detect a high number of warm bearings, corrected bearing, or hot bearings on the same train.

Statistically, in normal operating conditions, it would be abnormal to detect an excessive number of trains in the group of trains with warm bearings, excessive atypical bearings, excessive atypical bearings.

Statistically, in normal operating conditions, it would be abnormal to detect a large variation in the train side average bearing temperature between scanner 12 and scanner 14. A large variation may indicate a loss of calibration or alignment both requiring system maintenance to resolve.

Moreover, system 10 is programmed to identify abnormal conditions that include, but are not limited to, excessive number of warm bearings identified on a train, excessive number of trains in the a group of trains with warm bearings, excessive atypical bearings, and/or excessive delta temperature between the calculated trainside average temperatures. Based upon configurable thresholds, these maintenance alerts can also be used to inhibit normal hot box alarm generation until maintenance personnel take corrective action. As a result, system 10 is enabled to automatically analyze the highside statistics and generate automatic maintenance alerts based upon the detection of abnormally high readings identified by statistical analysis of primary sensor data.

Configurable count maintenance thresholds based upon profile flags may be established for each profile flag or for a collection of flags.

Also maintenance thresholds can be established for individual train analysis or for summary analysis on a group of trains.

Described herein is a method for reducing false train stops. The method includes receiving inputs from a sensor, generating a bearing profile using the received inputs, classifying the bearing profile as at least one of a typical bearing profile and an atypical bearing profile, and if the bearing profile is classified as a typical bearing profile, analyzing the typical bearing profile to determine if at least a portion of the typical bearing profile exceeds a predetermined threshold.

While the invention has been described in terms of various specific embodiments, those skilled in the art will recognize that the invention can be practiced with modification within the spirit and scope of the claims.

What is claimed is:

1. A method for reducing false train stops, said method comprising:
   receiving, at a processing unit, inputs from a sensor;
   generating, using the processing unit, a bearing profile from the received inputs for each bearing passing the sensor, wherein each bearing profile includes a plurality of temperature readings;
   analyzing, using the processing unit, the bearing profile to identify at least one significant waveform;
   classifying the bearing profile as at least one of a typical bearing profile and an atypical bearing profile, wherein an atypical bearing profile includes more than one significant waveform; and
   if the bearing profile is classified as a typical bearing profile, analyzing the typical bearing profile to determine if at least a portion of the typical bearing profile meets a predetermined alarm criteria.

2. A method in accordance with claim 1, wherein receiving inputs from a sensor further comprises scanning a passing component with an infrared scanner, wherein the scanner is mounted to a railroad track.

3. A method in accordance with claim 1, wherein if the bearing profile is classified as an atypical bearing profile, said method further comprises storing the atypical bearing profile in a database or memory such that the atypical bearing profile is not analyzed.

4. A method in accordance with claim 1, wherein analyzing, using the processing unit, the bearing profile to identify at least one significant waveform further comprises determining a quantity of rising edges, a quantity of falling edges, and a quantity of temperature peaks in the bearing profile.

5. A method in accordance with claim 4, further comprising determining a delta threshold between a peak temperature and a valley temperature in the bearing profile, utilizing the peak and valley temperatures to detect the at least one significant waveform, and categorizing the bearing profiles as either typical or atypical based on the quantity of significant waveforms.

6. A method in accordance with claim 4, further comprising classifying a bearing profile as atypical if the quantity of significant waveforms within a bearing profile exceeds a significant waveform count threshold that is configurable by an operator.

7. A method in accordance with claim 6, further comprising setting the significant waveform count threshold to a value of one.

8. A method in accordance with claim 6, further comprising:
   identifying a waveform in the bearing profile;
   identifying a rising edge in the waveform;
   determining whether the rising edge rises above a threshold;
   determining the temperature peak of the waveform;
   identifying a falling edge in the waveform; and
   determining whether the falling edge falls below a predetermined falling edge threshold.

9. A method in accordance with claim 1, further comprising:
   storing the typical and atypical bearing profiles in a database;
   marking the typical bearing profile with a first indicator; and
   marking the atypical bearing profile with a second indicator that is different than the first indicator.

10. A method in accordance with claim 1, further comprising:
    determining if a quantity of the plurality of temperature readings of the bearing profile that exceed a predetermined temperature level exceeds a predetermined quantity of temperature readings; and
    classifying the bearing profile as an atypical bearing profile if the quantity of the plurality of temperature readings of the bearing profile that exceed a predetermined temperature level exceeds the predetermined quantity of temperature readings.

11. A method in accordance with claim 1, further comprising:
    generating a bearing profile for each bearing assembly passing the sensor; and
    logging the results of at least one of the generated bearing profiles.

12. A method in accordance with claim 11 wherein receiving inputs from a sensor further comprises:
    receiving inputs from the sensor while scanning a plurality of trains; and
    recording the time and date when the scanner inputs were received.

13. A method in accordance with claim 12, further comprising generating summary statistics for each respective train, the summary statistics including the quantity of typical and atypical bearing profiles recorded for each respective train.

14. A method in accordance with claim 13, further comprising generating a maintenance alert indication when the quantity of atypical bearing profiles exceeds a predetermined threshold.

15. A hotbox detection system configured for detecting overheated railroad journal bearings, said hotbox detection system comprising:
- a first infrared bearing scanner;
- a second infrared bearing scanner; and
- a processing unit coupled to said first and second infrared bearing scanners, said processing unit programmed to:
- receive inputs from said first and second infrared bearing scanners;
- generate at least one bearing profile, using the received inputs, for each bearing passing said first and second infrared bearing scanners, wherein each bearing profile includes a plurality of temperature readings;
- analyze the at least one bearing profile to identify at least one significant waveform;
- classify the bearing profile as at least one of a typical bearing profile and an atypical bearing profile, wherein an atypical bearing profile includes more than one significant waveform; and
- if the bearing profile is classified as a typical bearing profile, analyze the typical bearing profile to determine if at least a portion of the typical bearing profile meets a predetermined alarm criteria.

16. A hotbox detection system in accordance with claim 15, wherein said processing unit is further programmed to store the atypical bearing profile in a database without analyzing the atypical bearing profile, which facilitates reducing false stops.

17. A hotbox detection system in accordance with claim 15, wherein said processing unit is further programmed to analyze the bearing profile to identify a quantity of rising edges, a quantity of temperature peaks, and a quantity of falling edges to determine a quantity of significant waveforms in the bearing profile.

18. A hotbox detection system in accordance with claim 17, wherein said processing unit is further programmed to:
- identify a rising edge in the bearing profile;
- determine if any of the rising edges rise above a rising edge threshold;
- identify a falling edge in the bearing profile;
- determine whether the falling edge falls below a predetermined falling edge threshold;
- identify temperature peaks in the bearing profile; and
- identify significant waveforms in the bearing profile.

19. A hotbox detection system in accordance with claim 18, wherein said processing unit is further programmed to:
- store the typical and atypical bearing profiles in a database;
- mark the typical bearing profile with a first indicator; and
- mark the atypical bearing profile with a second indicator that is different than the first indicator.

20. A hotbox detection system in accordance with claim 15, wherein said processing unit is further programmed to:
- determine if a quantity of the plurality of temperature readings of the bearing profile that exceed a predetermined temperature level exceeds a predetermined quantity of temperature readings; and
- classify the bearing profile as an atypical bearing profile if the quantity of the plurality of temperature readings of the bearing profile that exceed a predetermined temperature level exceeds the predetermined quantity of temperature readings.

21. A method for reducing false train stops, said method comprising:
- receiving, at a processing unit, inputs from at least one sensor;
- generating, using the processing unit, a bearing profile utilizing the received inputs;
- analyzing the bearing profile to determine if any portion of the bearing profile exceeds a predetermined alarm criteria;
- analyzing, using the processing unit, the bearing profile to identify at least one significant waveform; and
- classifying the bearing profile, based on a number of significant waveforms identified within the bearing profile, as at least one of a typical bearing profile and an atypical bearing profile.

22. A method in accordance with claim 21, further comprising generating a hotbox alarm signal only if the bearing profile is classified as a typical bearing profile.

* * * * *